UNITED STATES PATENT OFFICE.

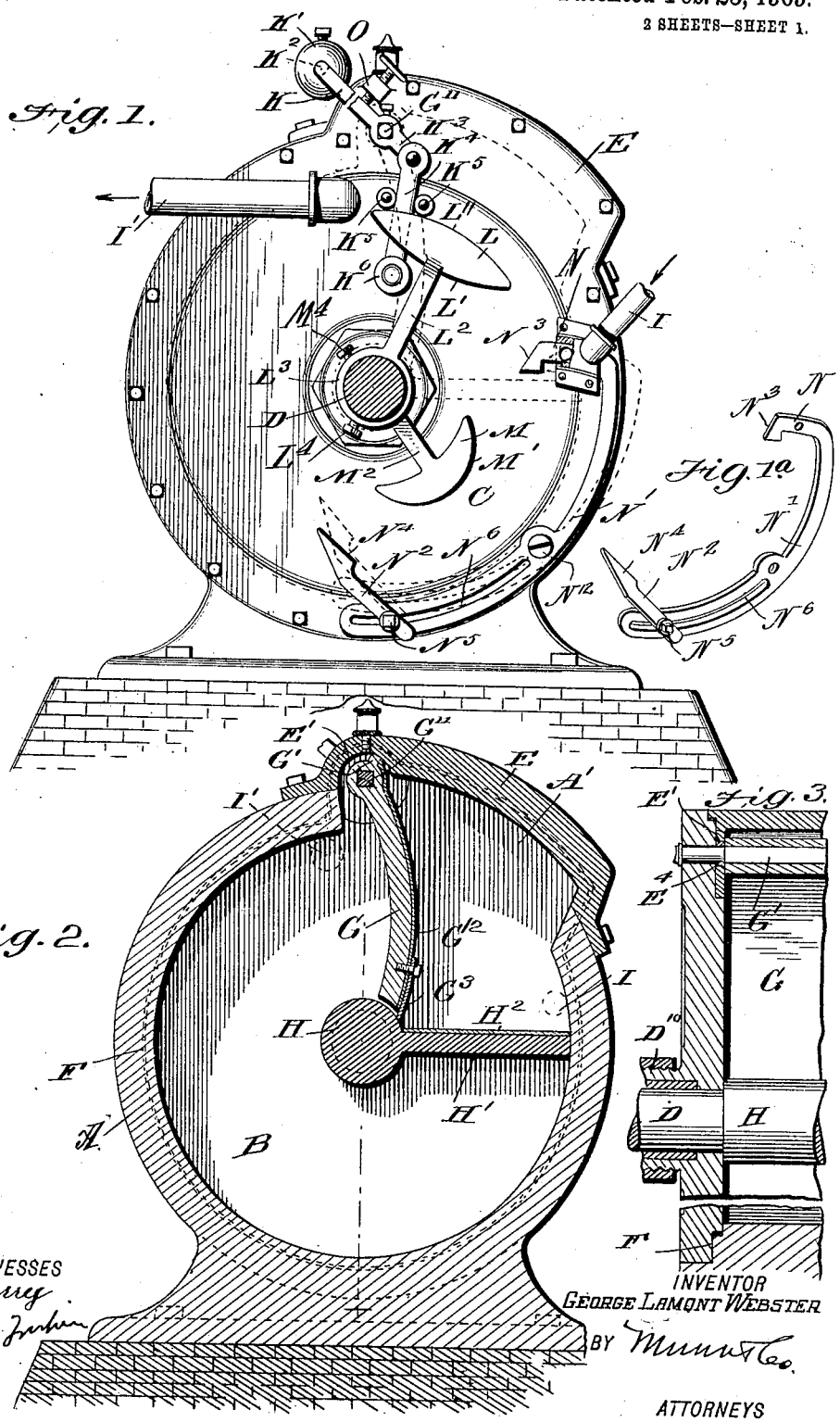

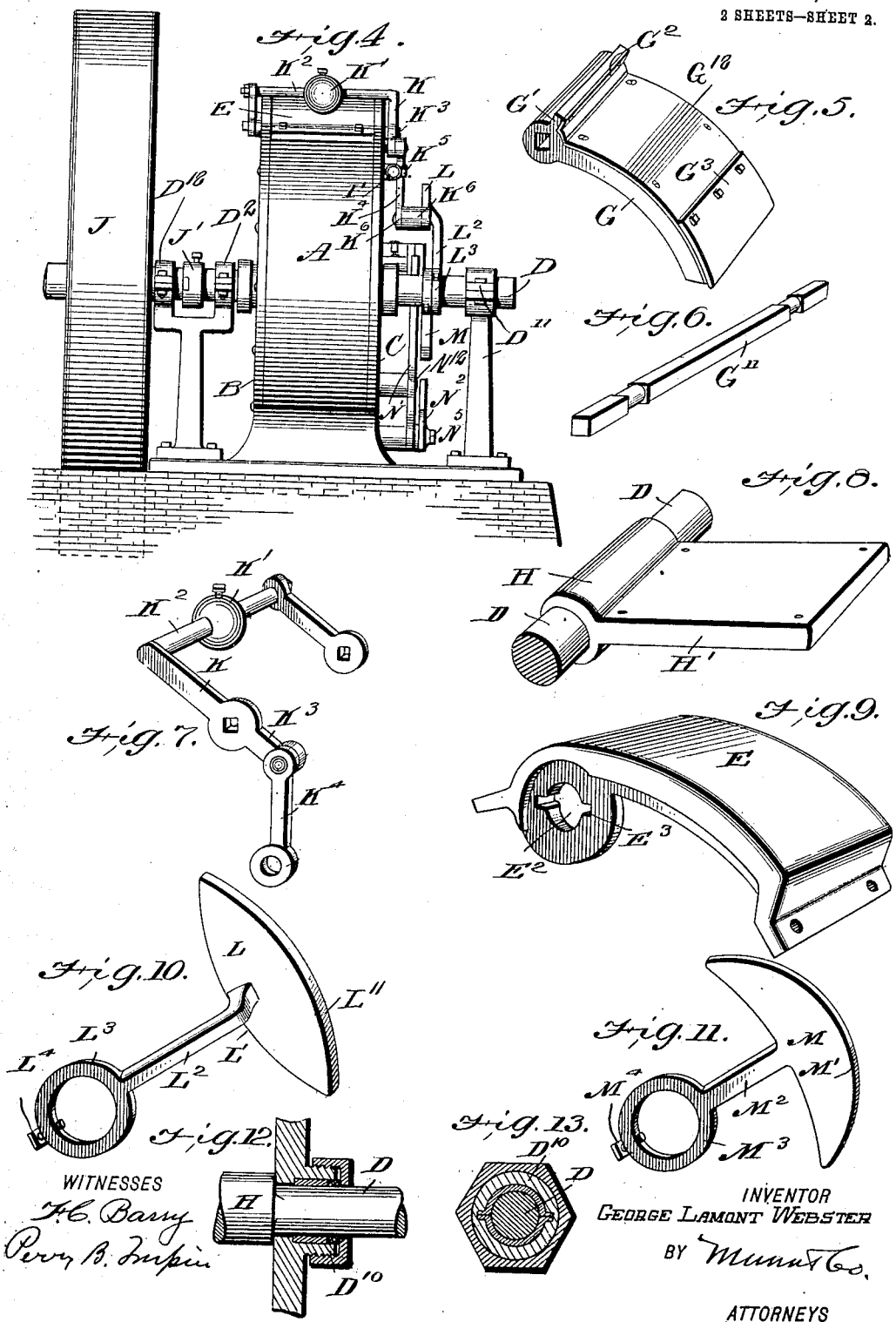

GEORGE LAMONT WEBSTER, OF MIDLOTHIAN, TEXAS, ASSIGNOR TO THE WEBSTER FULL EXPANSION ROTARY ENGINE COMPANY, OF ST. JOSEPH, MISSOURI, A CORPORATION OF MISSOURI.

ROTARY ENGINE.

No. 913,443.     Specification of Letters Patent.     Patented Feb. 23, 1909.

Application filed August 13, 1908. Serial No. 448,281.

*To all whom it may concern:*

Be it known that I, GEORGE LAMONT WEBSTER, a citizen of the United States, residing at Midlothian, in the county of Ellis and State of Texas, have invented an Improvement in Rotary Engines, of which the following is a specification.

This invention is an improvement in rotary engines and has for an object, among others, to provide a novel construction whereby the primary and expansive power of steam may be utilized in an advantageous manner; and the invention consists in certain novel constructions and combinations of parts as will be hereinafter described and claimed.

In the drawings Figure 1 is a side elevation of an engine embodying my invention and, Fig. 1$^a$ is a detail view of the valve. Fig. 2 is a transverse section of an engine embodying my invention. Fig. 3 is a detail section illustrating the connection between the cylinder and heads of the casing. Fig. 4 is an elevation of the engine. Fig. 5 is a detail view of the swinging abutment. Fig. 6 is a detail view of the shaft of said abutment. Fig. 7 is a detail perspective view of the counter-balancing device for the abutment. Fig. 8 is a detail view of the piston and a portion of the shaft. Fig. 9 is a detail perspective view of the abutment shell. Fig. 10 is a detail view of the cam for operating the abutment and valve. Fig. 11 is a detail perspective view of the cam for opening the abutment. Figs. 12 and 13 are detail sectional views illustrating the stuffing box for the piston shaft.

In carrying out the invention I employ a casing having a cylinder A, which may be mounted on any suitable form or base, and the end heads B and C having bearings for the shaft D of the piston, and at one side, preferably its upper side, the cylinder A has an extension wing A′ covered by the abutment shell E. The abutment operates in this wing as presently described. In fitting the cylinder A and heads B and C together it is preferred to rabbet the heads at F and to fit the heads of the cylinder and of the shell E in the rabbeted portions and supply suitable packing as will be understood from dotted lines Fig. 2, and from the sectional view Fig. 3, to secure a tight joint of the parts.

The abutment G is pivoted at one edge at $G^{11}$ by its shaft in the casing, and has its pivoted end rocking within a circular recess E′ in the shell E and such end of the abutment is provided with a projecting wing G′ having a full face packing $G^2$ on one side and moving snugly against the wall of the circular recess E′ in the shell E, as shown in Fig. 2 and will be understood from Fig. 5, in order to secure a tight joint at such point.

The face of the abutment G is provided with a packing blade $G^{12}$ of any suitable material and at its swinging edge the abutment G has a packing strip $G^3$ which rests against the piston body H and forms a tight joint between such parts. The piston body, it will be noticed, is of small diameter in order to afford a maximum steam space within the cylinder, and it is provided with a single blade H′ suitably packed at $H^2$ and bearing at its outer edge within the cylinder.

Steam is admitted at I and exhausted at I′, the steam and exhaust pipes I and I′ communicating at such points with the interior of the casing, as will be understood from full lines Fig. 1, and dotted lines Fig. 2. When the parts are in the position shown in Figs. 1 and 2 the piston will be operating by momentum, see its fly-wheel J, and will so operate until the valve N controlling the feed port is opened, when the steam will operate primarily against the piston blade H′ until the feed valve N is closed when the steam will begin to act expansively and will operate by its secondary action until the blade H′ passes the exhaust and the engine will continue to operate by momentum until the feed valve N is again opened. Means for this purpose are provided, as will be described more fully hereinafter, but it will be noticed I secure a full primary and secondary action of the steam, thus utilizing its power to a considerable extent to the end of economy of steam in the operation of the engine.

The piston shaft D is mounted in a bearing $D^{11}$, at one side of the casing and in a bearing $D^2$ at the other side of the casing, a companion bearing $D^{12}$ being provided for the shaft of the fly wheel J, and a coupling J′ being provided for connecting the shaft D with the shaft of the fly wheel. This permits me to use a fly wheel of considerable size and weight without straining the bearing of the engine as will be understood from Fig. 3 of the drawings.

The shaft $G^{11}$ of the abutment extends through the casing and connects with a counterbalanced rocker K which rocks concentrically with the shaft $G^{11}$, and has at its outer end a counter-balanced weight K', which balances the weight of the abutment so the latter will move with great ease and can be opened to the full line position shown in Fig. 2, or closed up into its shell without any great jar on the engine. As shown, the rocker K is in the form of a frame having bars extending around the opposite sides of the casing, and the weight K' is supported on the cross rod $K^2$ so that the weight may be disposed midway between the ends of the casing to secure an even operation of the abutment and avoid any twisting strain on the rocker. The rocker has an arm $K^3$, to which is connected a link $K^4$ guided between antifriction rollers $K^5$ on the casing, and having at its free end an antifriction roller $K^6$ for engagement by the opening and closing cams presently described.

Cams L and M are provided for respectively opening and closing the abutment, to which end the cam L has an inner edge or surface L' to engage on the outer side of or above the roller $K^6$, while the cam M has its outer edge M' arranged to engage against the lower side of the roller $K^6$ to push the said roller and the link $K^4$ outwardly to close the abutment, while the edge L' of the cam L pulls the link to the position shown in Fig. 1, to open the abutment to the position shown in Fig. 2 of the drawings. These links L and M are carried on the piston shaft, being provided with arms $L^2$ and $M^2$, and rings $L^3$ and $M^3$, and clamping screws $L^4$ and $M^4$ for securing the rings to the piston shaft as will be understood from Fig. 1 of the drawings. At its outer edge $L^{11}$ the cam L is arranged to operate the feed valve N between open and closed positions. It will be noticed that the cam L is slightly deflected relatively to its arm $L^2$ so the said cam may operate in the same plane with the cam M, and the said cams be both supported on the piston shaft in the manner described. The feed valve N is supported at one end of a lever N' pivoted between its ends at $N^{12}$ and carrying the valve N at its upper end and an adjustably supported bearing $N^2$ at its lower end, the upper or valve carrying end of the lever having a bearing at $N^3$ for engagement by the cam L in the operation of the invention. The bearing $N^2$ is in the form of a bar having a surface $N^4$ for engagement by the cam L, and the bar is connected by a bolt $N^5$ with the lever N' through a slot $N^6$ so the bearing $N^2$ may be adjusted both pivotally on its bolt $N^5$ and along the slot $N^6$ to secure any desired operation of the engine.

Now in the operation of this particular construction, when the parts are in the position shown in Fig. 1, it will be understood as before suggested, that the feed valve is in closed position and the piston is running by momentum and it will so run until the cam L strikes the bearing $N^3$ of the valve lever to throw the same to the dotted line position shown in Fig. 1, opening the valve and permitting steam to pass between the abutment G and the piston blade H'. The engine will now operate by the primary action of the steam until the cam L engages with the bearing $N^4$ of the valve lever when it will readjust the said lever to the position shown in full lines Fig. 1, shutting off the feed of steam after which the steam will act expansively until the blade H' passes the exhaust port I'.

In Fig. 9 it will be noticed the opening at $E^2$ in the shell E for the shaft $G^{11}$ has radial slots $E^3$ receiving lugs of the bushing sections $E^4$, see Fig. 3.

The shaft D passes from the casing through stuffing boxes $D^{10}$, shown in detail in Figs. 12 and 13 of the drawings.

It will be understood from the foregoing description when the parts are properly arranged and adjusted they will engage each other at the proper time, and operate as before described. Consequently high or low speed will make no difference in the operation of the engine, the degree of speed being simply a question of pressure and strength of material. Manifestly any suitable form of governor may be used if desired. The cams for opening and closing the abutment are independently adjustable on the shaft so they may be set with great accuracy to operate in the manner described.

As best shown in Fig. 1 I provide an adjustable stop O for limiting the movement of the rocker K, and thus limit the opening movement of the abutment whereby to prevent the same from bearing with undue pressure against the body of the piston.

I claim—

1. The combination in a rotary engine of a casing, a pivoted abutment, a counterbalanced frame connected with said abutment and having an outwardly extending portion, and a weight thereon, and an inwardly extending arm, a link extending inwardly from said arm, guiding devices for said link, a piston having a blade coöperating with the abutment, and cams connected with the said piston and adapted to engage with the said link for moving the same inwardly and outwardly for opening and closing the abutment, and a feed valve arranged for operation by one of said cams, substantially as set forth.

2. The combination of a pivoted abutment, a counterbalanced frame connected between its ends with said abutment, and having its outer end weighted and its other end extending inwardly beyond the abutment, and provided with means for engagement by operating cams, cams operating upon said means for opening and closing the abutment, and a piston operating the cams opening and closing the abutment, and a piston operating said cams.

3. The combination with a piston and a pivoted abutment, of a crank arm in connection with the abutment, a sliding link connected with said arm, devices for guiding said link in its longitudinal movements means on said link for engagement by operating cams, and cam devices carried by the piston and engaging successively above and below said means the link whereby to positively operate the link longitudinally first in one and then in the other direction in order to open and close the abutment, substantially as set forth.

4. The combination with an abutment, and a piston, of a lever pivoted between its end and having a feed valve at one end and a bearing at said end, and also having a bearing at its other end, a cam operating upon one of said bearings to open the valve and upon the other bearing to close the same, a device connecting with the abutment and arranged for operation by said cam to move the abutment in one direction, and a second cam for moving the abutment in the opposite direction, substantially as set forth.

5. The combination in a rotary engine with a piston, of a feed valve, a lever carrying said feed valve at one end, a bearing at said end of the lever, a bearing at the other end of the lever, and cam devices operated by the piston and engaging with one of said bearings to open the valve, and with the other bearing to close the valve, substantially as set forth.

6. The combination with a pivoted abutment, and a piston coöperating therewith, of a pair of cams, carried by the piston and arranged one to open the abutment and the other to close the same, and a valve lever pivoted between its ends, and having a bearing at its opposite ends for engagement by one of said cams.

7. The combination with a pivoted abutment, of a crank arm engaging therewith, a link connected with said crank arm and extending thence inwardly, a roller at the inner end of said link, devices for guiding said link, a piston, and a pair of cams carried by said piston, one of said cams engaging on the outer side of the link roller to open the abutment, and the other on the inner side of said roller to close the abutment, substantially as set forth.

8. A rotary engine comprising a casing, a pivoted abutment, a counterbalancing frame having side bars secured to said abutment, one of said bars having an inwardly projecting extension beyond the connection with the abutment, and the said counter-balancing frame having a cross rod, and a weight secured thereon, a link extending inwardly from the inwardly extended portion of the frame arm, guiding devices for said link, a roller carried by the link, a piston in the casing, a cam carried by the piston and operating on one side of the said roller, a second cam carried by the piston and operating on the other side of said roller, and a valve lever pivoted between its ends and having a valve at one end, and a bearing at said end, and also having a bearing at its other end, said bearings being arranged for engagement and operation by one of the said cams carried by the piston, all substantially as and for the purposes set forth.

9. The combination with the casing and valve chest, of a lever pivoted between its ends and having a feed valve at one end and a bearing at said end, and having on the opposite side of its pivot from said feed valve a longitudinal slot, a bar held adjustably in said slot, and having a bearing for engagement by a cam, a piston, and a cam carried by the piston for engaging the bearings at the opposite ends of the pivoted valve lever, substantially as set forth.

10. The combination with a pivoted abutment, of a rocker connected therewith between its ends, and having counterbalancing weights at its outer end, and its inner end extended inwardly beyond its connection with the abutment, an adjustable stop for engagement by said rocker whereby to limit the opening movement of the abutment and prevent the same from bearing with undue force upon the piston body and means connected with the inner extension of the rocker for operating the same, substantially as set forth.

11. The combination with a casing and a valve chest, of a lever pivoted between its ends and having at one end a lateral wing provided with a feed port and operating in said valve chest, and also having at said end a bearing, a bearing at the other end of the lever, a piston, and a cam carried by the piston and operating upon said bearings of the valve lever to open and close the valve, substantially as set forth.

12. A rotary engine substantially as herein described, comprising a casing, a piston, an abutment, a feed valve independent of the abutment, a cam having an outer edge arranged to close the abutment, and a cam having an inner edge to open the abutment, and an outer edge arranged to operate upon the feed valve, substantially as set forth.

13. The combination in a rotary engine, with the piston, the feed valve, and the abutment, of a link extending along side the casing, devices for guiding said link, a cam operating with the piston and having an inner edge operating upon the link to open the abutment, and an outer edge to operate the feed valve, and a second cam operating upon the link to readjust the abutment to the closed position, substantially as set forth.

GEORGE LAMONT WEBSTER.

Witnesses:
SOLON C. KEMON,
PERRY B. TURPIN.